(12) United States Patent
Young (10) Patent No.: US 10,605,282 B1
(45) Date of Patent: Mar. 31, 2020

(54) PANEL MOUNTING DEVICE (71) Applicant: Jonathan Young, Troutville, VA (US)

(72) Inventor: Jonathan Young, Troutville, VA (US)

( * ) Notice: Subject to any disclaimer, the term of this patent is extended or adjusted under 35 U.S.C. 154(b) by 0 days.

(21) Appl. No.: 16/155,834

(22) Filed: Oct. 9, 2018

Related U.S. Application Data (60) Provisional application No. 62/569,727, filed on Oct. 9, 2017.

(51) Int. Cl.
*F16B 5/02* (2006.01)
*F16B 5/06* (2006.01)

(52) U.S. Cl.
CPC ............ *F16B 5/025* (2013.01); *F16B 5/0685* (2013.01)

(58) Field of Classification Search
USPC ..................................... 248/229.12
See application file for complete search history.

(56) References Cited

U.S. PATENT DOCUMENTS

| | | | | |
|---|---|---|---|---|
| 6,672,018 B2* | 1/2004 | Shingleton | ............ | F24S 25/636 52/173.3 |
| 8,806,813 B2* | 8/2014 | Plaisted | .................. | H01R 4/64 52/173.3 |
| 8,839,575 B1* | 9/2014 | Liu | ......................... | H02S 20/23 52/173.3 |
| 8,925,263 B2* | 1/2015 | Haddock | ................. | H02S 20/23 52/173.3 |
| 8,938,932 B1* | 1/2015 | Wentworth | ............. | H02S 20/23 52/747.1 |
| 9,584,062 B2* | 2/2017 | Ganshaw | ................ | H02S 20/23 |
| 10,270,385 B2* | 4/2019 | Xie | .......................... | F24S 25/63 |
| 10,432,136 B2* | 10/2019 | Lu | ............................. | H02S 30/10 |
| 2003/0015637 A1* | 1/2003 | Liebendorfer | .......... | H02S 20/23 248/237 |
| 2003/0101662 A1* | 6/2003 | Ullman | .................... | E04D 13/12 52/27 |
| 2004/0123550 A1* | 7/2004 | Hartman | ................. | E04B 7/024 52/831 |
| 2006/0086382 A1* | 4/2006 | Plaisted | ................ | F24S 25/636 136/244 |
| 2008/0244881 A1* | 10/2008 | Zante | ...................... | H02S 20/23 24/530 |
| 2011/0138585 A1* | 6/2011 | Kmita | ..................... | H02S 20/00 24/522 |
| 2011/0174947 A1* | 7/2011 | Wu | ......................... | F24S 25/61 248/226.11 |
| 2011/0214365 A1* | 9/2011 | Aftanas | ................. | F24S 25/636 52/173.3 |
| 2011/0220596 A1* | 9/2011 | Cusson | ................... | H02S 20/30 211/41.1 |
| 2011/0260027 A1* | 10/2011 | Farnham, Jr. | ........... | H02S 20/00 248/309.1 |
| 2015/0102194 A1* | 4/2015 | Liu | ........................ | F24J 2/5258 248/316.1 |

(Continued)

*Primary Examiner* — Monica E Millner
(74) *Attorney, Agent, or Firm* — Robert R. Lech; Lech Law, LLC (57) ABSTRACT

Panel mounting devices are disclosed herein. The disclosed panel mounting devices comprise a clamp assembly and a configurable leg. The clamp assembly comprises a bolt, a nut and a body. The body comprises a first pressure surface operative to apply pressure to a first adjacent panel. The leg is configurable in at least two positions. In one position the leg rests on a rail thereby preventing lateral movement of the device.

11 Claims, 11 Drawing Sheets

(56) References Cited

U.S. PATENT DOCUMENTS

| | | | | |
|---|---|---|---|---|
| 2015/0129517 A1* | 5/2015 | Wildes | ................... | H02S 20/23 |
| | | | | 211/41.1 |
| 2015/0183066 A1* | 7/2015 | Lippert | ................... | F24S 25/35 |
| | | | | 29/428 |
| 2015/0218822 A1* | 8/2015 | Blazley | ................... | E04D 3/30 |
| | | | | 52/173.3 |
| 2015/0280638 A1* | 10/2015 | Stephan | ................... | H02S 20/23 |
| | | | | 52/173.3 |
| 2015/0288320 A1* | 10/2015 | Stearns | ................... | H02S 20/23 |
| | | | | 52/173.3 |
| 2016/0268958 A1* | 9/2016 | Wildes | ................... | H02S 20/23 |
| 2017/0104442 A1* | 4/2017 | MacRostie | ............. | H02S 20/23 |
| 2019/0013772 A1* | 1/2019 | Bamat | ................... | H02S 20/23 |

\* cited by examiner

PANEL MOUNTING DEVICE

CROSS-REFERENCE TO RELATED APPLICATIONS

This application claims priority to U.S. Provisional Patent Application Ser. No. 62/569,727 filed Oct. 9, 2017 entitled "Photovoltaic Panel Universal Attachment System," which is incorporated by reference in its entirety as if fully set forth herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

Technical Field

The present invention generally relates to mounting devices. More particularly, the present invention relates to mounting devices for securing panels, such as photovoltaic panels, for example, in a linear configuration.

Background and Description of Related Art

Panel mounting devices and systems are well known. Such mounting devices and systems may be used to mount an array or matrix of panels, including tiles, video display panels, and photovoltaic (solar) panels.

The inventive devices and systems described herein improve upon prior art panel attachment devices and systems. Prior art mounting systems typically utilize two types of clamps: One clamp, sometimes referred to as a "mid-clamp," to mount two adjacent panels; and a second clamp, sometimes referred to as a "end-clamp," to clamp one panel at the end of a row. Furthermore, many different versions of mid clamps and end clamps are produced to accommodate various thicknesses of solar and other panels.

Ordering, tracking, warehousing, and installation all these different clamp types cause inefficiencies to producers, distributors and installers. Therefore, there is a need for a clamp device and system that addresses the aforementioned shortcomings of the prior art.

Two universal clamp designs are described herein that are compatible with multiple panel thicknesses, and that can be used as a mid-clamp and an end clamp, thus requiring only one clamp for all cases, reducing the cost of a solar panel system.

SUMMARY OF EXAMPLE EMBODIMENTS

Accordingly, the present invention is directed to an improved tile cutting device that substantially obviates one or more problems resulting from the limitations and deficiencies of the related art.

According to a first embodiment of the present application, Applicant discloses a panel mounting device comprising: a clamp assembly and a leg. The clamp assembly comprises a bolt, a nut and a body, and the body comprises a first pressure surface operative to apply pressure to a first adjacent panel. The leg is configurable in at least two positions. In the first position, the leg rests on a rail thereby preventing lateral movement and/or uplift of the device According to a second embodiment of the present application, Applicant discloses a panel mounting device comprising: a clamp assembly and a leg. The clamp assembly comprises a bolt, a nut and a body. The body comprises two pressure surfaces: a first pressure surface operative to apply pressure to a first adjacent panel, and a second pressure surface operative to apply pressure to a second adjacent panel. The leg is removably secured to the body, and when it is secured to the body, the leg is operative to rest on a rail thereby preventing lateral movement and/or uplift of the device.

BRIEF DESCRIPTION OF THE DRAWINGS

The invention will now be described, by way of example, with reference to the accompanying drawings, which are incorporated in and constitute a part of the specification, in which.

DRAWING REFERENCE NUMERALS

The following reference characters identify the associated elements depicted in the drawings describing the present invention:
100 Panel Array
110 Panel
120 Rail
200 Clamp
210 Body
212 Grounding Pin
214 Leg
216 Nut
217 Flange
218 T-Bolt
220 Pressure Surface

DETAILED DESCRIPTION

Particular embodiments of an example device will now be described in greater detail with reference to the figures. Like reference numerals apply to similar parts throughout the several views.

Figure 1:
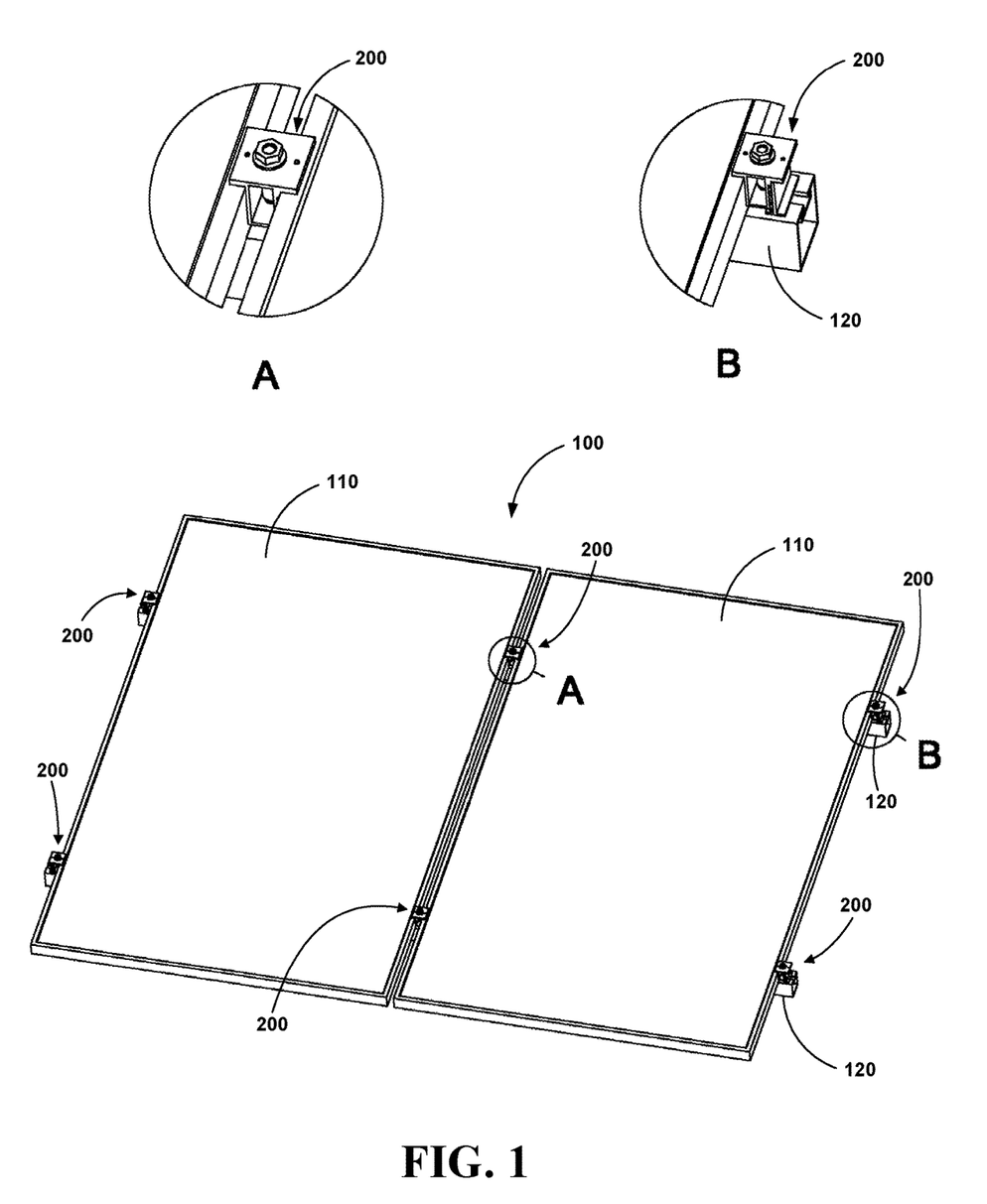
FIG. 1 is an orthographic view of a panel array with two magnified views of a first example panel mounting device in two configurations.

FIG. 1 illustrates an orthographic view of a panel array 100 comprising two panels 110. The panels are installed atop two rails 120. The panels 110 are secured to rails 120 using six instances of a first example panel mounting device 200

FIG. 1 further illustrates two magnified views of the first example panel mounting device 200 in two configurations. Magnified view A depicts the first example panel mounting device 200 in a mid-clamp configuration. Magnified view B depicts the first example panel mounting device 200 in an end-clamp configuration.

Figure 2:
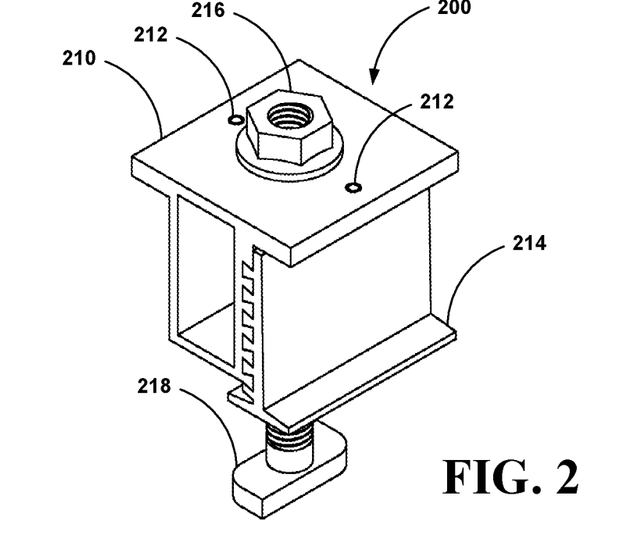
FIG. 2 is an orthographic view of the first example panel mounting device in an end clamp configuration.

Referring now to FIG. 2, an orthographic view of the first example panel mounting device 200 is presented. Device 200 comprises a body 210 which may comprise one or more grounding pins 212. The first example panel device 200 comprises two (2) such grounding pins 212. Device 200 the first example panel mounting device 200 further comprises a leg 214 which may be configured in various ways as described herein. As depicted in FIG. 2, first example panel device 200 is in an end-clamp configuration.

Device 200 still further comprises a nut 216 and a bolt 218. Although nut 216 is depicted as comprising flange 217, one of ordinary skill in the art will recognize that there may be a number of alternative nuts that will work with the present invention. Similarly, bolt 218 is depicted as a T-bolt, but one of ordinary skill in the art will recognize that there may be a number of alternative bolts that will work with the present invention.

Figure 3:
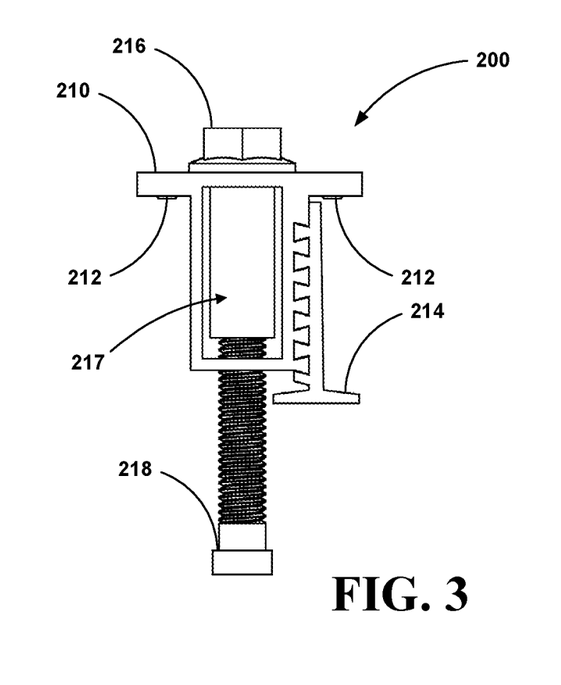
FIG. 3 is a front side view of the first example panel mounting device in an end clamp configuration.
Figure 4:
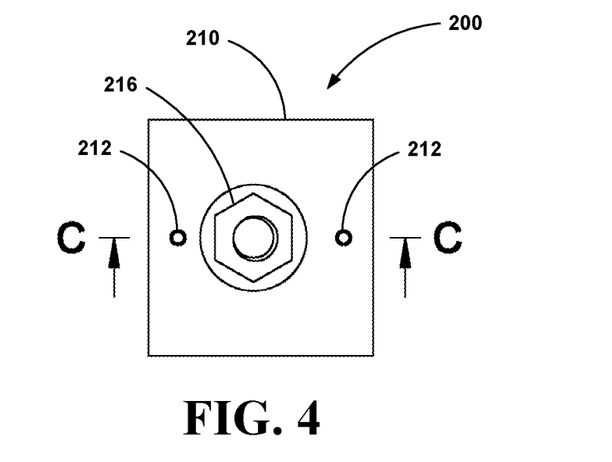
FIG. 4 is a top side view of the first example panel mounting device in an end clamp configuration.
Figure 5:
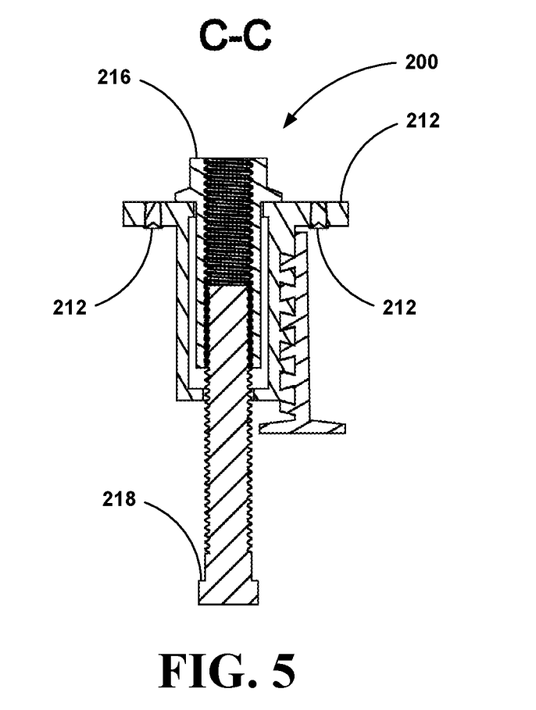
FIG. 5 is a cutaway view of the first example panel mounting device in an end clamp configuration.

FIG. 3 is a front side view of the first example panel mounting device 200 in an end clamp configuration; FIG. 4 is a top side view of the first example panel mounting device 200 in an end-clamp configuration; FIG. 5 is a cutaway view C-C from FIG. 4 of the first example panel mounting device 200 in an end-clamp configuration; and FIG. 6 is an exploded view of the first example panel mounting device 200.

Figure 6:
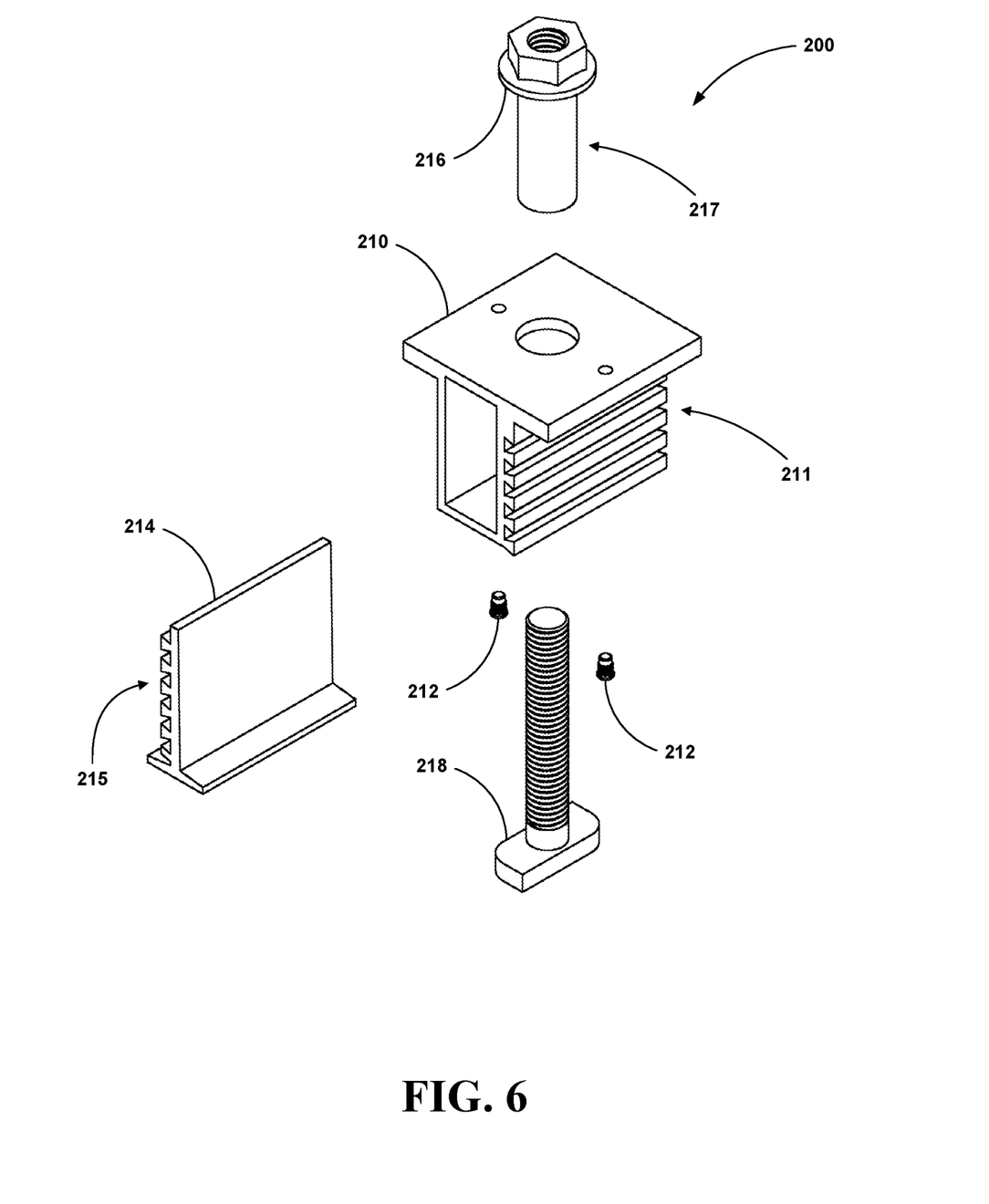
FIG. 6 is an exploded view of the first example panel mounting device.

As best shown in FIG. 6, body 210 and leg 214 comprise an attachment mechanism which allows leg 214 to be removably attached to the body 210. The illustrated attachment mechanism comprises dovetails 211 and 215 formed by the body 210 and leg 214, respectively. The depicted attachment mechanism also enables a position of leg 214 to be adjusted relative to the base 210, thereby enabling the apparent length of the leg 214 to be lengthened or shortened.

Figure 7:
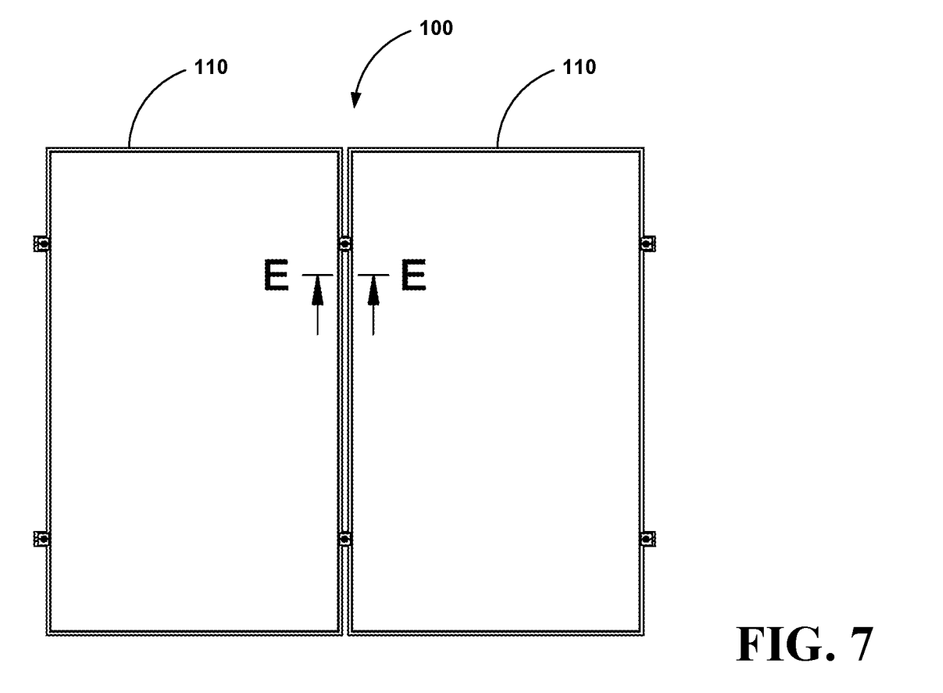
FIG. 7 is a top side view of a panel array employing the first example panel mounting device in two configurations.
Figure 8:
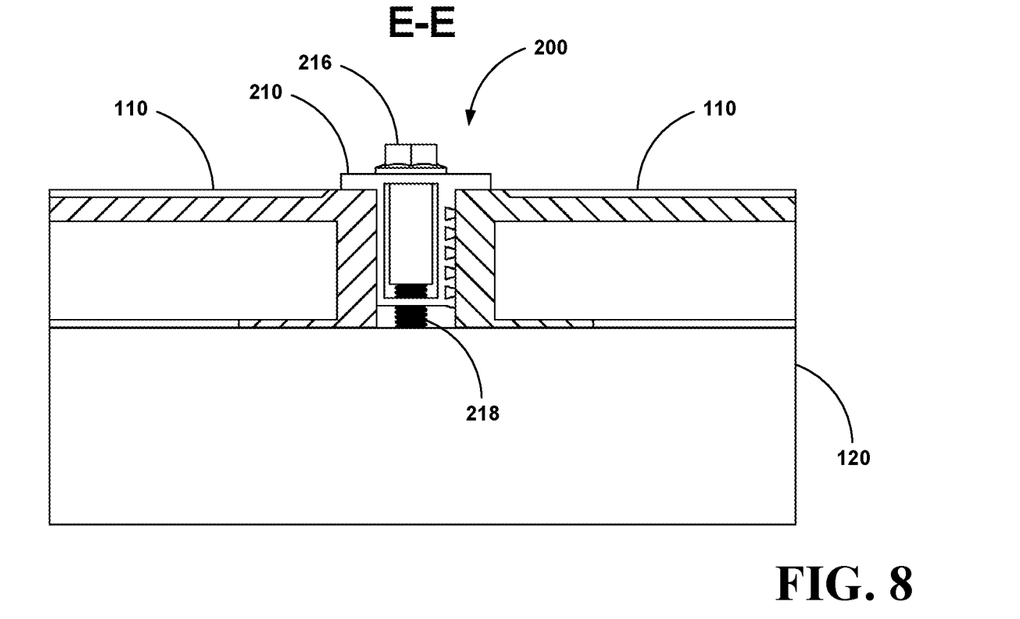
FIG. 8 is a magnified cutaway view of the first example panel mounting device in a mid-clamp configuration.

Referring now to FIGS. 7 and 8, there is depicted an orthographic view of panel array 100 with a cutaway view E-E depicted between the two instances of device 200 configured as mid-clamps. FIG. 8 is a cutaway view E-E from FIG. 7. As illustrated, device 200 is installed with leg 214 removed, thereby configuring device 200 as a mid-clamp.

Figure 9:
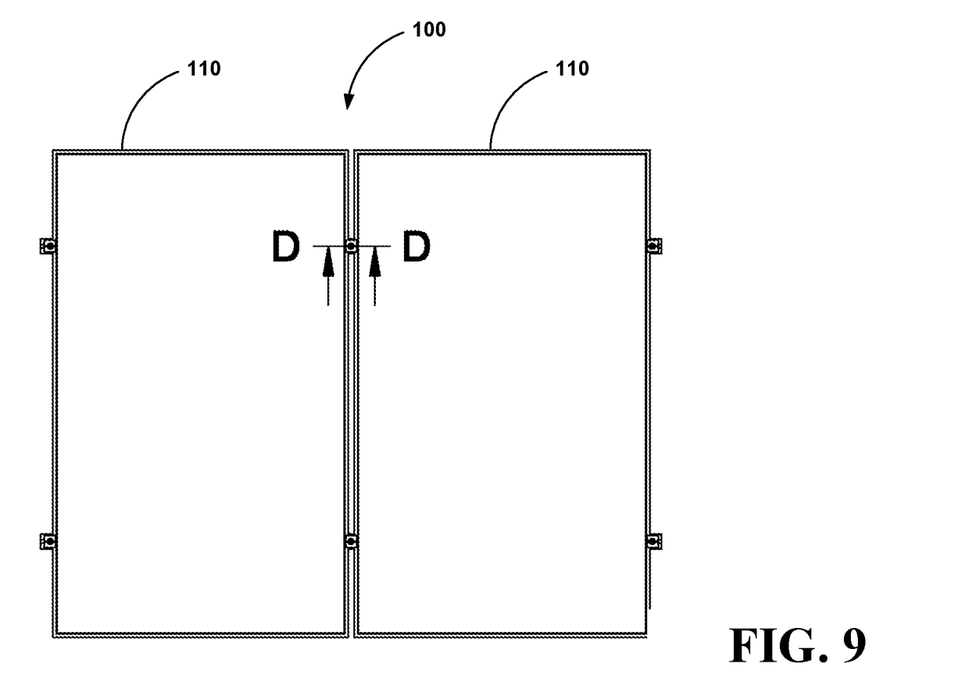
FIG. 9 is a top side view of a panel array employing the first example panel mounting device in two configurations.
Figure 10:
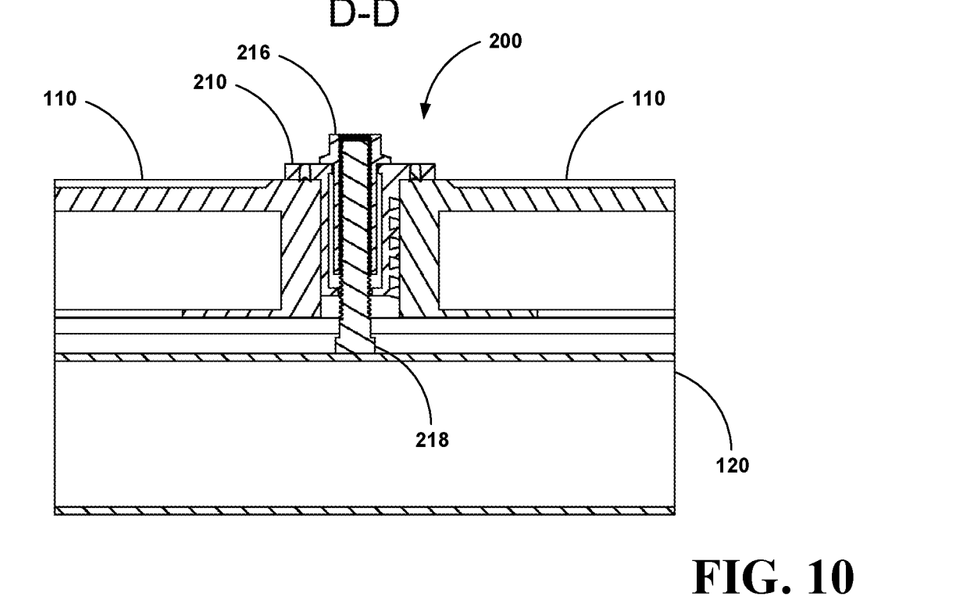
FIG. 10 is a magnified cutaway view of the first example panel mounting device in a mid-clamp configuration.

Referring now to FIGS. 9 and 10, there is depicted an orthographic view of panel array 100 with a cutaway view D-D depicted running through one of the two instances of device 200 configured as a mid-clamp. FIG. 10 is a cutaway view D-D from FIG. 9.

Figure 11:
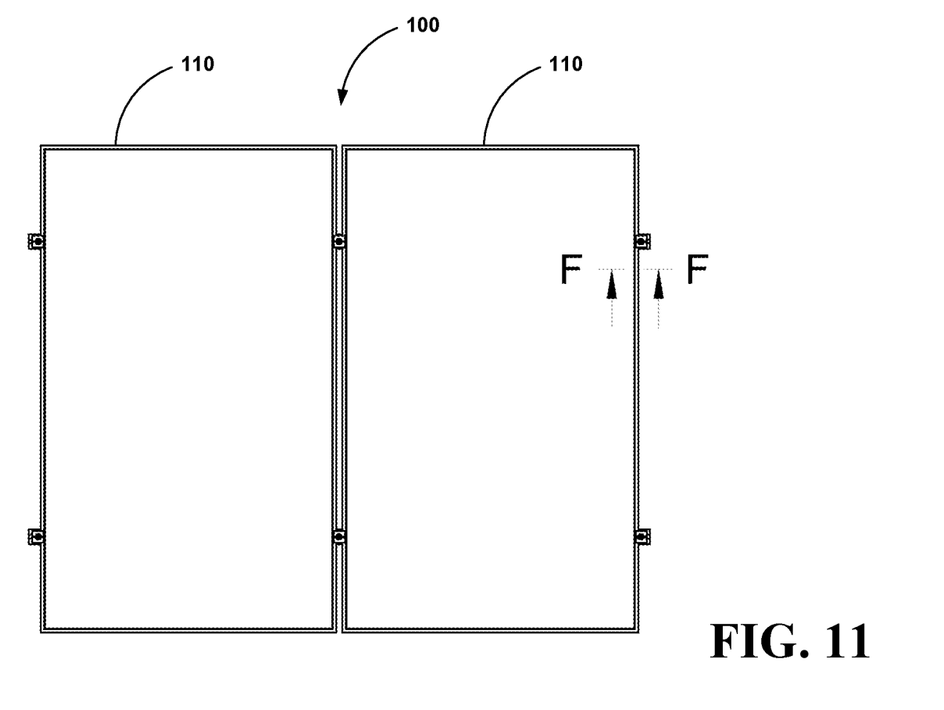
FIG. 11 is a top side view of a panel array employing the first example panel mounting device in two configurations.
Figure 12:
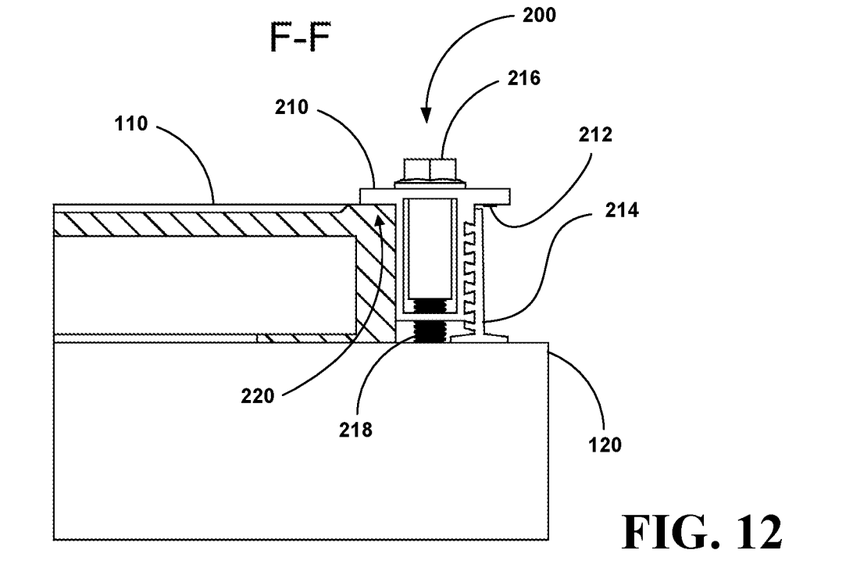
FIG. 12 is a magnified cutaway view of the first example panel mounting device in an end-clamp configuration.

Referring now to FIGS. 11 and 12, there is depicted an orthographic view of panel array 100 with a cutaway view F-F depicted between the two rightmost instances of device 200 configured as an end-lamp. FIG. 12 is a cutaway view F-F from FIG. 11. As shown in FIG. 12, base 210 comprises a surface 220 which applies pressure on panel 110 thereby securing panel 110 to rail 120. The first example panel mounting device 200 comprises leg 214 removably attached to base 210 and adjusted so that leg 214 extends from the bottom of base 210 to rest on the top of rail 120, thereby preventing lateral movement and/or uplift of the device.

FIG. 12 is a cutaway view F-F from FIG. 11. As shown in FIG. 12, base 210 comprises a surface 220 which applies pressure on panel 110 thereby securing panel 110 to rail 120. The first example panel mounting device 200 comprises leg 214 removably attached to base 210 and adjusted so that leg 214 extends from the bottom of base 210 to rest on the top of rail 120, thereby preventing lateral movement and/or uplift of the device.

Figure 13:
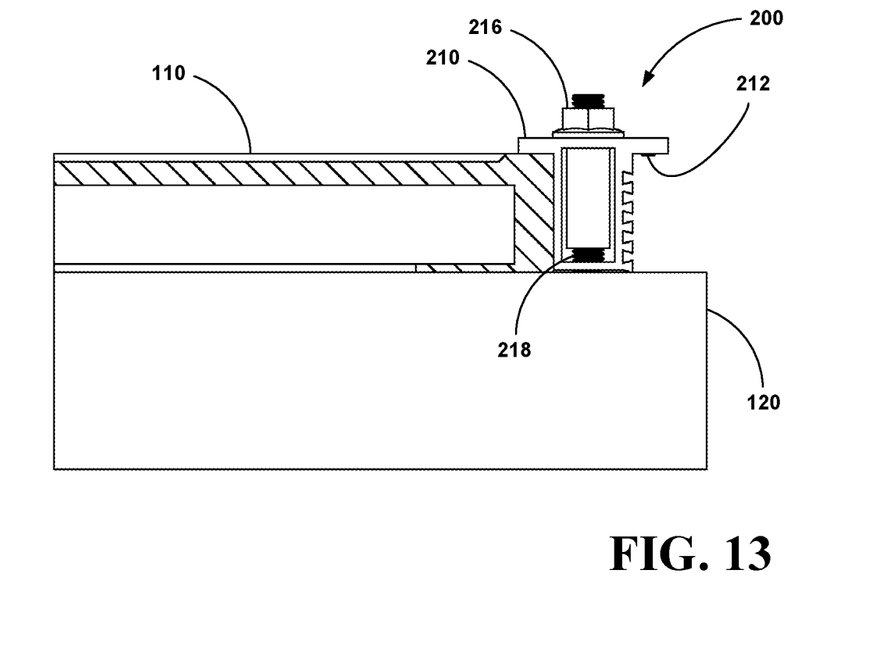
FIG. 13 is a magnified cutaway view of the first example panel mounting device in an end-clamp configuration without a leg.
Figure 14:
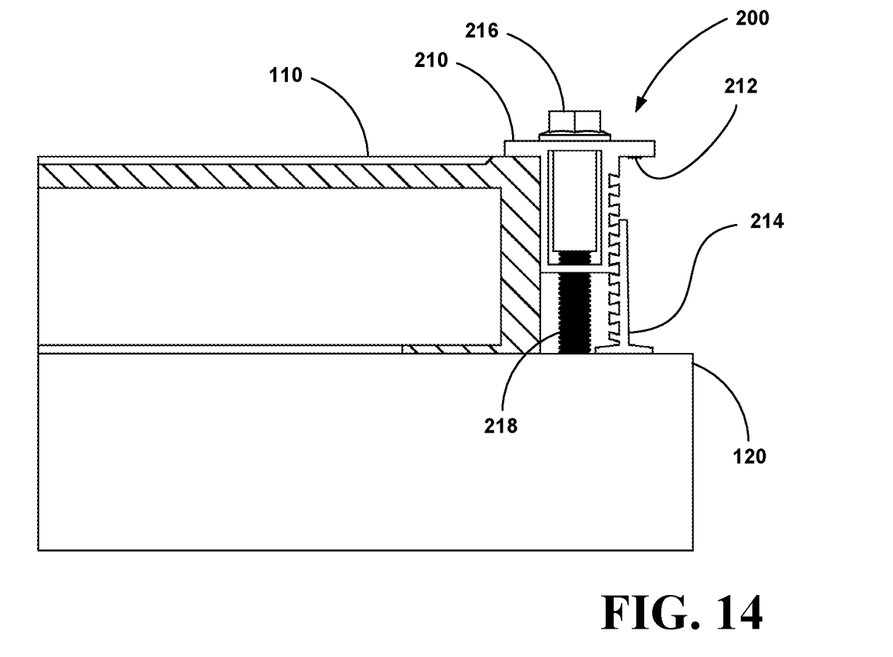
FIG. 14 is a magnified cutaway view of the first example panel mounting device in an end-clamp configuration with a leg adjusted to rest on a rail.
Figure 15:
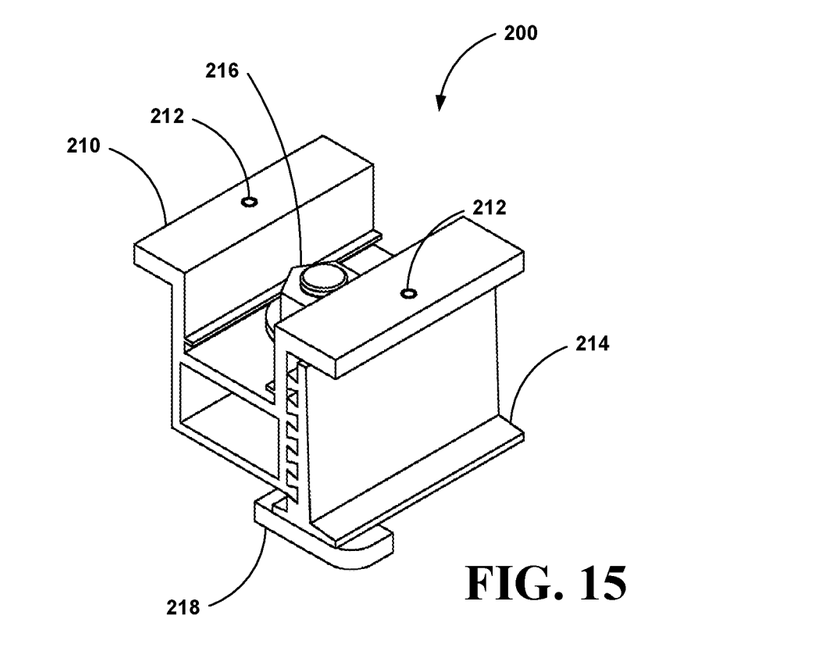
FIG. 15 is an orthographic view of a second example panel mounting device in an end clamp configuration.
Figure 16:
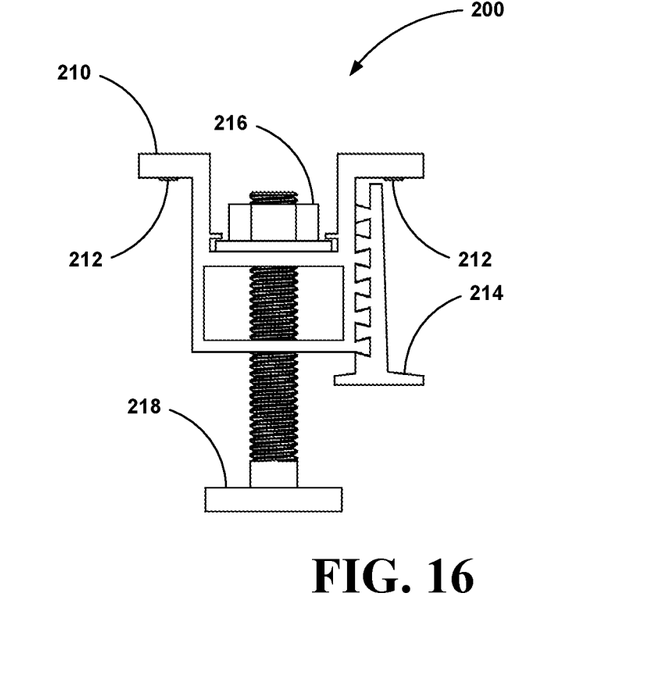
FIG. 16 is a front side view of the second example panel mounting device in an end clamp configuration.
Figure 17:
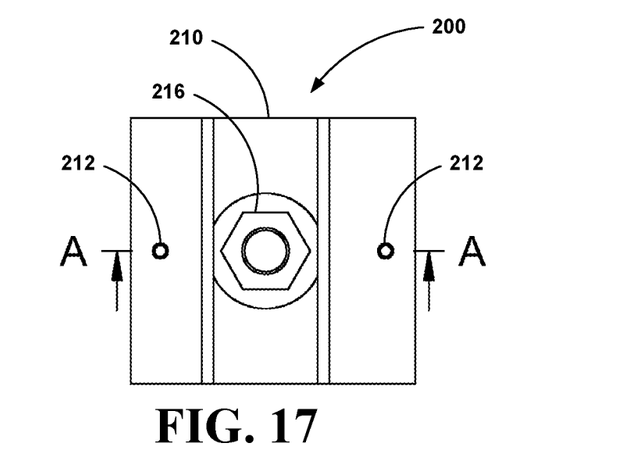
FIG. 17 is a top side view of the second example panel mounting device in an end clamp configuration.
Figure 18:
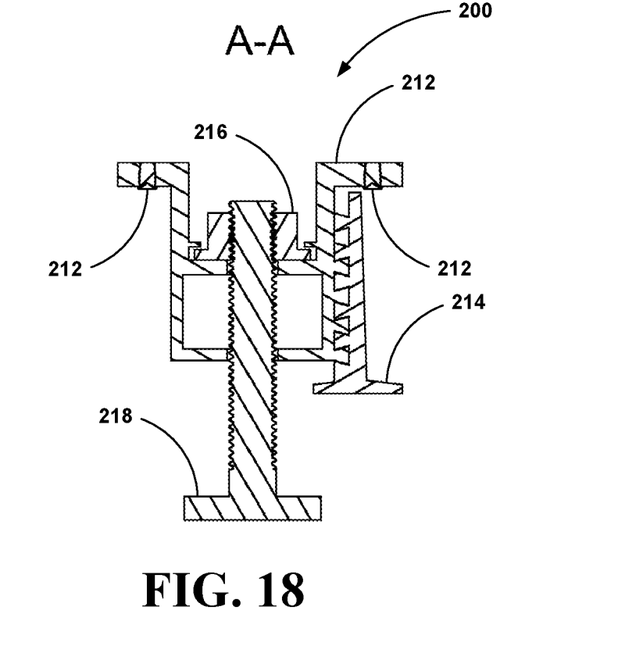
FIG. 18 is a cutaway view of the first example panel mounting device in an end clamp configuration.
Figure 19:
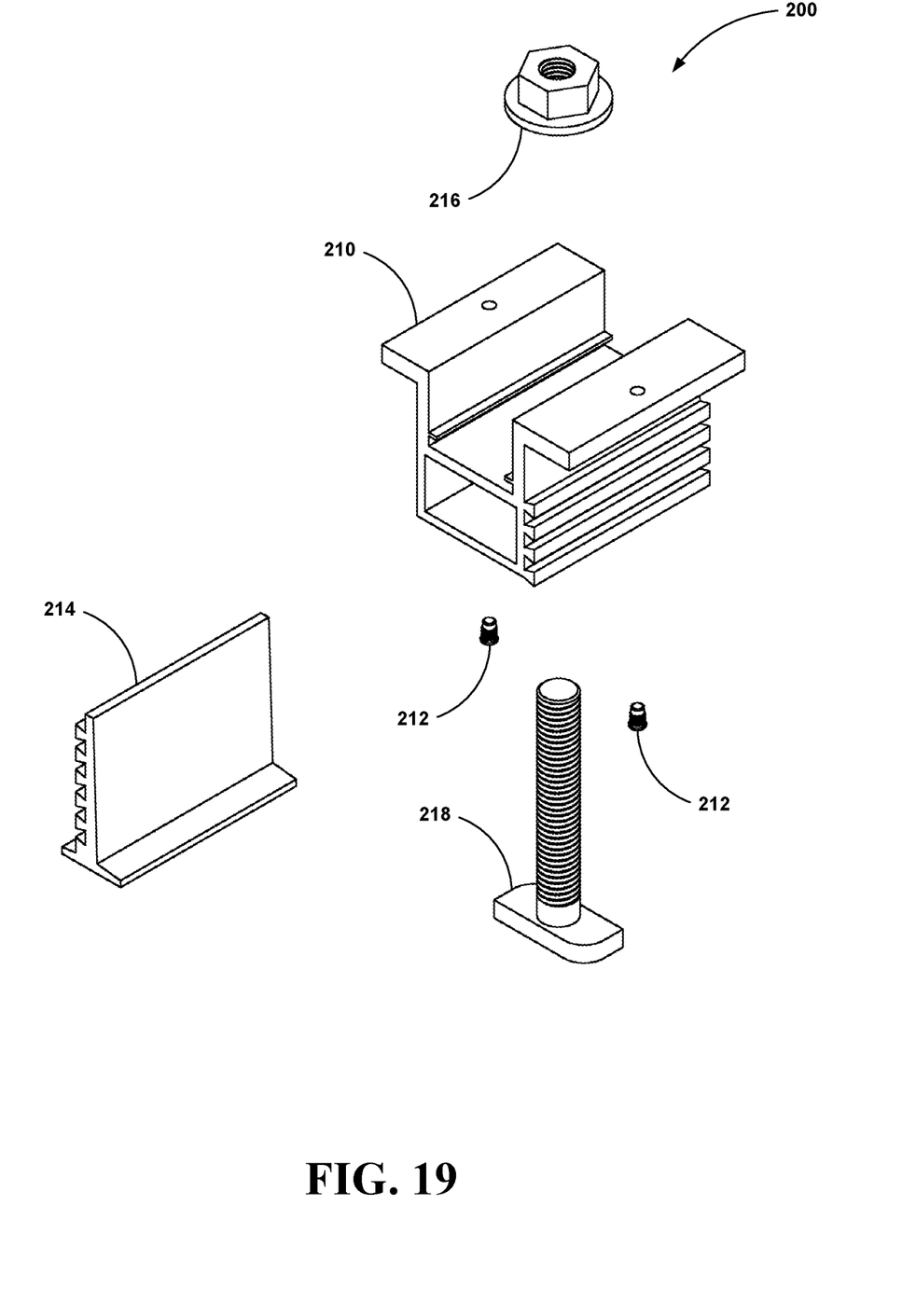
FIG. 19 is an exploded view of the second example panel mounting device.

FIGS. 13 and 14 illustrate that device 200 can be adjusted to accommodate panels of different thicknesses. FIG. 13 is a cutaway of a relatively thin panel 110 and device 200. Panel 110 of FIG. 13 is one of the thinnest panels that device 220 can accommodate, and when device 200 is used as an end-clamp with thinner panels 110 device 220 may be used without employing leg 214. This is particularly true when, even at the shortest adjustment setting, leg 214 would prove to be too long. In such special circumstances, device 220 may be used as an end-clamp without employing leg 214.

FIG. 14 illustrates the use of device 200 as an end clamp on relatively thick panels. As illustrated, leg 214 is removably attached to body 210 in the third adjustment position, thereby extending leg 214 well beyond the bottom of body 210.

Referring now to FIGS. 15-19, an alternate embodiment of the first example panel mounting device 200 is depicted. FIGS. 15-19 are similar to FIGS. 2-6. The primary difference is that the device 200 of FIGS. 15-19 comprises a recessed top, thereby allowing nut 216 to reside below the upper surface of the panels secured by the device.

While the devices, systems, methods, and so on have been illustrated by describing examples, and while the examples have been described in considerable detail, it is not the intention of the applicant to restrict, or in any way, limit the scope of the appended claims to such detail. It is, of course, not possible to describe every conceivable combination of components or methodologies for purposes of describing the devices, systems, methods, and so on provided herein. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's general inventive concept. Thus, this application is intended to embrace alterations, modifications, and variations that fall within the scope of the appended claims. The preceding description is not meant to limit the scope of the invention. Rather, the scope of the invention is to be determined by the appended claims and their equivalents.

Finally, to the extent that the term "includes" or "including" is employed in the detailed description or the claims, it is intended to be inclusive in a manner similar to the term "comprising," as that term is interpreted when employed as a transitional word in a claim. Furthermore, to the extent that the term "or" is employed in the claims (e.g., A or B) it is intended to mean "A or B or both." When the applicants intend to indicate "only A or B, but not both," then the term "only A or B but not both" will be employed. Similarly, when the applicants intend to indicate "one and only one" of A, B, or C, the applicants will employ the phrase "one and only one." Thus, use of the term "or" herein is the inclusive, and not the exclusive use. See Bryan A. Garner, A Dictionary of Modern Legal Usage 624 (2*d*. Ed. 1995).

What is claimed is:

1. A panel mounting device for securing a first adjacent panel to a rail, the device comprising:
    a clamp assembly comprising a bolt, a nut and a body, the body comprising a first pressure surface operative to apply downward pressure to the first adjacent panel; and
    a leg, the leg being configurable in at least two positions, in the first position the leg is removably secured to the body and the leg rests on the rail thereby preventing lateral movement and uplift of the device, in the second position the leg is removed from the body.

2. The panel mounting device of claim 1 wherein:
    the body comprises a dovetail attachment mechanism;
    the leg comprises a dovetail attachment mechanism; and
    the leg is removably secured to the body using the respective dovetail attachment mechanisms.

3. The panel mounting device of claim 1 wherein the leg is adjustable with respect to the body, thereby accommodating panels of varying thicknesses.

4. The panel mounting device of claim 1 wherein:
    the leg is configured in a second position in which the leg is removed from the body; and
    the body comprises a second pressure surface operative to apply downward pressure to a second adjacent panel.

5. The panel mounting device of claim 1 wherein the nut comprises a flange, the flange being configured to receive the bolt, and the body forming a first aperture sized to receive the flange.

6. The panel mounting device of claim 5 wherein the body forms a second aperture sized to receive the bolt, the bolt passes through the second aperture and cooperates with the nut, thereby fixing the relative positions of the body, the bolt and the nut.

7. A panel mounting device for securing a first adjacent panel and a second adjacent panel to a rail, the device comprising:
    a clamp assembly comprising a bolt, a nut and a body, the body comprising two pressure surfaces: a first pressure surface operative to apply downward pressure to the first adjacent panel, and a second pressure surface operative to apply downward pressure to the second adjacent panel; and
    the leg being configurable in at least two positions, in the first position the leg is removably secured to the body and the leg rests on the rail thereby preventing lateral movement and uplift of the device, in the second position the leg is removed from the body;
    a leg, the leg being configurable in at least two positions, when the leg is in the first position the leg is removably secured to the body and the panel mounting device operates as an end-clamp, when the leg is in the second position the leg is removed from the body and the panel mounting device operates as a mid-clamp.

8. The panel mounting device of claim 7 wherein:
    the body comprises a dovetail attachment mechanism;
    the leg comprises a dovetail attachment mechanism; and
    the leg is removably secured to the body using the respective dovetail attachment mechanisms.

9. The panel mounting device of claim 7 wherein the leg is adjustable with respect to the body, thereby accommodating panels of varying thicknesses.

10. The panel mounting device of claim 7 wherein the nut comprises a flange, the flange being configured to receive the bolt, and the body forming a first aperture sized to receive the flange.

11. The panel mounting device of claim 10 wherein the body forms a second aperture sized to receive the bolt, the bolt passes through the second aperture and cooperates with the nut, thereby fixing the relative positions of the body, the bolt and the nut.

* * * * *